US012595691B2

(12) United States Patent
Perrin et al.

(10) Patent No.: US 12,595,691 B2
(45) Date of Patent: Apr. 7, 2026

(54) DECLUTCHING SYSTEM FOR A HANDLE ARRANGEMENT

(71) Applicant: U-shin Italia S.p.A, Pianezza (IT)

(72) Inventors: Christophe Perrin, Nevers (FR); Thomas Lanno, Nevers (FR)

(73) Assignee: U-shin Italia S.p.A, Pianezza (IT)

( * ) Notice: Subject to any disclaimer, the term of this patent is extended or adjusted under 35 U.S.C. 154(b) by 162 days.

(21) Appl. No.: 18/188,772

(22) Filed: Mar. 23, 2023

(65) Prior Publication Data

US 2023/0304332 A1 Sep. 28, 2023

(30) Foreign Application Priority Data

Mar. 23, 2022 (EP) .................................... 22163918

(51) Int. Cl.
*E05B 81/90* (2014.01)
*E05B 13/00* (2006.01)
(Continued)

(52) U.S. Cl.
CPC ............ *E05B 81/90* (2013.01); *E05B 13/004* (2013.01); *E05B 17/0058* (2013.01); *E05B 81/46* (2013.01); *E05B 85/10* (2013.01)

(58) Field of Classification Search
CPC ...... E05B 81/46; E05B 81/90; E05B 17/0054; E05B 17/0058; E05B 17/044;
(Continued)

(56) References Cited

U.S. PATENT DOCUMENTS 4,773,240 A * 9/1988 Foshee ................ E05B 17/0058 70/222
5,413,392 A * 5/1995 Schlack ................ E05B 35/008 70/451
(Continued)

FOREIGN PATENT DOCUMENTS

DE 10 2014 117 005 A1 5/2016
DE 10 2017 001 769 A1 8/2018
DE 102018210422 A1 * 1/2020 ......... E05B 15/0053

OTHER PUBLICATIONS

European Search Report issued Sep. 7, 2022 in EP 22163918.0 filed on Mar. 23, 2022 5 pages.

*Primary Examiner* — Alyson M Merlino
(74) *Attorney, Agent, or Firm* — Oblon, McClelland, Maier & Neustadt, L.L.P.

(57) ABSTRACT

A declutching system for handle arrangement of a motor vehicle includes: an axle whereon are arranged a housing and a declutching member. The declutching system presents two positions: a clutch position wherein the declutching member blocks the housing in rotation around the axle by cooperating with at least one cam of the housing, and a declutch position wherein the declutching member allows the housing to rotate around the axle. The declutching member includes a body to which extends at least one reversible deformable leg. In the clutched position, the at least one reversible deformable leg cooperates with the at least one cam of the housing and blocks into rotation the housing around the axle. In the declutched position, the at least one reversible deformable leg is deformed in the direction of the body and thereof enabling the rotationally displacement of the housing around the axle.

14 Claims, 3 Drawing Sheets

(51) Int. Cl.
*E05B 17/00* (2006.01)
*E05B 81/46* (2014.01)
*E05B 85/10* (2014.01)

(58) Field of Classification Search
CPC .... E05B 17/045; E05B 17/046; E05B 13/002; E05B 13/004; E05B 13/005; E05B 13/101; E05B 2047/0026; E05B 2047/003; E05B 2047/0031; E05B 65/0014; E05B 2015/0465
See application file for complete search history.

(56) References Cited

U.S. PATENT DOCUMENTS

| | | | | | |
|---|---|---|---|---|---|
| 5,651,280 | A * | 7/1997 | Park | E05B 17/0058 | 70/472 |
| 6,067,827 | A * | 5/2000 | Haseley | E05B 35/008 | 292/DIG. 60 |
| 9,032,769 | B2 * | 5/2015 | Villagrasa | B60R 25/0211 | 70/186 |
| 11,788,322 | B2 * | 10/2023 | Chan | E05B 47/02 | 70/277 |

* cited by examiner

DECLUTCHING SYSTEM FOR A HANDLE ARRANGEMENT

BACKGROUND OF THE INVENTION

Field of the Invention

The invention relates to a declutching system for a handle arrangement of a motor vehicle, in particular in the case of automated door latches that are controlled via electric means.

Description of the Related Art

Automated door latches selectively lock or release vehicle door panels in an automated fashion. By automated door latches are herein designated door latches provided with a manually operable handle element and a rotatably mounted transmission lever which is connected to the handle element and can be rotated by actuating the handle element to such an extent that it activates a switch for opening the door latch.

Once the door panel is released, the user or an electric panel actuator swings or slides the panel to grant physical access to the vehicle.

However, in such electrical system, problems may arise when the doors cannot be electrically opened anymore, particularly in case of a crash accident or because of an empty vehicle battery.

Document DE102014117005 proposes a solution to this problem by providing a handle arrangement wherein a rotatably transmission lever connected to a handle element is blocked into rotation by a declutching system when the handle element is actuated under a predetermined force threshold. Hence, when the user actuates the handle element below the predetermined force threshold, he actuates the electrical opening system of the handle arrangement. When the user actuates the handle element above the predetermined force threshold, he declutches the mechanical opening system of the handle arrangement.

BRIEF SUMMARY OF THE INVENTION

However, the declutching system disclosed in this document comprises different members with quite complex shapes and interactions.

The invention intends to obviate this lack in the art.

The object of the invention is to provide a simpler and less expensive declutching system for a handle arrangement of a motor vehicle.

To that end, the invention relates to a declutching system for handle arrangement of a motor vehicle comprising an axle whereon are arranged a housing and a declutching member, the declutching system presenting two positions, a clutch position wherein the declutching member blocks the housing in rotation around the axle by cooperating with at least one cam of the housing and a declutch position wherein the declutching member allows the housing to rotate around the axle, wherein the declutching member comprises a body to which extends at least one reversible deformable leg, wherein in the clutched position of the declutching system, the at least one reversible deformable leg cooperates with the at least one cam of the housing and blocks into rotation the housing around the axle, and wherein in the declutched position of the declutching system, the at least one reversible deformable leg is deformed in the direction of the body and thereof enabling the rotationally displacement of the housing around the axle.

The declutching system of the invention takes the advantage to clutch and to declutch the rotation of the housing around the axle with solely the deformation of the at least one reversible deformable leg of the declutching member. Thereof, the invention requires only one element to achieve at the same time cooperation and deformation aspects needed for declutching. The force required to deform the at least one reversible deformable leg is the torque of magnitude which has to be applied on the housing for its rational displacement around the axle. Moreover, because of the reduced number of elements in the declutching system of the invention compared to the prior art, this system is more compact.

In operation, the declutching system moves from the clutched position to the declutched position when a torque of a magnitude above a predetermined threshold is applied on the housing. Accordingly, under normal circumstances, i.e., when the electrical panel actuator is operable, the declutching system is in its clutch position such that when the handles is actuated by a user with a torque of magnitude below the predetermined threshold, it will put into rotation a rotatably transmission lever until the latter be stop into rotation by the declutching system. Interestingly, the clutch position of the declutching system of the invention gives a haptic sensation to the user informing him he enough actuates the handle to trigger the electrical panel actuator and grant physical access to the vehicle.

Under abnormal circumstances, when the electrical panel actuator is not operable, for example in case of a crash or an empty vehicle battery, actuating the handle with a pulling force below the predetermined threshold will not trigger the electrical panel actuator. However, actuating the handle with a pulling force above the predetermined threshold will allow the housing to deform the at least one reversible leg of the declutching member and to be put into rotation around the axle. In that situation, the rotatably transmission lever will continue its rotation and the handle will be displaced with a higher aperture angle. The rotation of the transmission lever triggers a backup mechanical panel actuator allowing the panel to be opened.

When the user stops actuating the handle, the housing is droven back by the rotatably transmission lever and the declutching system returns to its clutch position. The at least one reversible deformable leg returns from an active deformed shape to a passive shape blocking the housing in rotation.

The declutching member presents two configurations corresponding to the two positions of the declutching system. Firstly, the declutching member has a block configuration wherein the at least one reversible deformable leg cooperates with the at least one cam of the housing and blocks the latter into rotation around the axle. Secondly, the declutching member has a release configuration wherein the at least one reversible deformable leg is deformed and cooperates with an adjacent surface to the at least one cam of the housing enabling the rotationally displacement of the housing around the axle. The declutching member passively moves from the release configuration to the block position because of the at least one reversible deformable leg.

The declutching member switches from the block configuration to the release configuration by the application of a load force by the at least one cam of the housing onto the at least one reversible deformable leg resulting in the deformation of the latter in the direction of the body.

With preference, the at least one leg is deformed along the axle.

In one embodiment of the invention, the at least one deformable leg of the declutching member is linked to the body by a principal hinge. The force threshold required to bend the said principal hinge of each deformable leg corresponds to the torque of magnitude to apply to the housing to move the declutching system toward the declutch position.

Notably, the declutching member is made in a single piece. The declutching member can be made in metal or in plastic.

According to one aspect, the at least one leg is preferably at least partially cut from the body. Accordingly, the body may have an opening in form of the projected shape or the flattening shape of the said at least one leg for each of the said at least one leg. Hence, the declutching member has a reduced overall size, participating to the compact aspect of the invention. When the declutching system is moved toward the declutch position, the at least one leg is deformed toward the corresponding opening of the body and fill it at least partially.

Furthermore, the principal hinge between the leg and the body can be made by a thinner portion than the adjacent portions of the leg and of the body. Alternatively, the thickness of the at least on leg is uniform.

Preferably, the at least one deformable leg of the declutching member extends from the peripheral side of the body.

With preference the declutching member comprises at least two legs reversible with corresponding cams carried by the housing. Increasing the number of legs increases the torque of magnitude required to move the housing around the axle.

In one embodiment of the invention, the at least one deformable leg of the declutching member has an opened end part and comprises an inclined surface extending from the body. The said inclined surface correspond to the base part of the deformable leg. In particular, the end and de base parts of the at least one deformable leg extend along crossing directions. In that aspect, the junction between the base and the end parts of the deformable leg can serves as a secondary hinge for the leg deformation. In particular, the end part of the leg extends parallelly to the body's surface.

In another embodiment of the invention, the at least one deformable leg of the declutching member is closed and comprises two inclined surfaces extending from the body which are connected by a middle part. In that aspect of the invention, the at least one deformable leg has a bridge-like shape. In particular, the middle part extends parallelly to the body's surface.

With preference, the at least one deformable leg of the declutching member is configured to conform at least partially the shape of the at least one cam of the housing.

In one embodiment of the invention, the housing is arranged on the axle in a rotationally displaceable manner and the declutching member is arranged on the axle in a rotationally and axially fixed manner. Accordingly, the declutching member does not move around or along the axle.

For this purpose, the body of the declutching member has a central opening cooperating with the axle. In particular, the central opening has a complementary form to the cross-section shape of the axle. More particularly, the opening can comprise at least one slit cooperating with a rib arranged along the axle to block the rotatably displacement of the declutching member around the axle.

In one embodiment of the invention, the body of the declutching member has a disc shape. Alternatively, the body of the declutching member is a disc spring.

With preference, the body of the declutching member is a metal plate. The body of the declutching member can be made also in plastic.

Potentially, the housing overlays the declutching member and the axle.

The housing may be crossing with the axle passing through.

In one embodiment of the invention, the housing comprises an inner shoulder defining a large chamber and a small chamber, the large chamber overlaying the declutching member and the at least one cam being arranged on the inner shoulder. In particular, the at least one cam is arranged, e.g., is excavated, in the inner shoulder. Accordingly, the at least one cam can correspond to a recess in the inner shoulder. In particular, the large and the small chambers may have a tube shape. Alternatively, the housing can have a bell shape with a through hole at its apex cooperating with the axle, the through hole defining the inner shoulder whereon is arranged the at least one cam.

The at least one cam of the housing can comprise two opposed slopes configurated to cooperate with the at least one deformable leg of the declutching element. The cam can present for example a "U" shape or a "V" shape. In particular, at least one of the opposed slopes of a cam cooperates with the deformable leg or one of the deformable legs when the declutching system is in the clutch position. When the declutching system moves from the clutching position to the declutching position, one of the slopes of the cam will apply a bearing force on the deformable leg of the declutching member, resulting in the deformation of the latter, in particular resulting in the bending of the latter around the principal hinge with the body, allowing the housing pivoting around the axle. When the declutching system reaches the declutching position, each deformable leg cooperates with a surface of the housing adjacent to the cam, holding each deformable leg in its deformation state. On the declutching position, each deformable leg can cooperate with an inner shoulder surface positioned adjacent to each one cam.

Preferably, the housing has a peripherical rib for its cooperation with the rotatably transmission lever and its actuating in rotation around the axle. The rib is disposed along the direction of the axle.

Each extremity of the axle can present a rectangular shape for its insertion in a bracket of the handle arrangement. Such shape of the extremities avoids the axle to pivot around them.

The axle can comprise two curve ribs disposed opposed along it, for its cooperation with the housing, in particular, for its cooperation with the small chamber of the housing.

The axle can comprise a block element in contact to the body of the declutching member, preventing the body of the declutching member to be axially displaced along the axle in the direction of the block element. In particular, the block element of the axle is a barrel with a circular cross-section shape reversible with the large chamber. The declutching member can be prevented to be displaced along the axle in the direction opposite of the block element by its contact with the housing, and more particularly, by the contact between the at least one deformable leg and the at least one cam.

The invention also relates to a handle arrangement for door lock comprising a declutching system as defined above.

BRIEF DESCRIPTION OF THE SEVERAL VIEWS OF THE DRAWINGS

The invention will be better understood in view of the following description, referring to the annexed figures in which.

DETAILED DESCRIPTION OF THE INVENTION

The following achievements are examples. Although the specification refers to one or several embodiments, it does not imply that each reference refers to the same embodiment or that the features apply only to a single embodiment. Simple features of different embodiments can also be combined to provide other embodiments.

Figure 1:
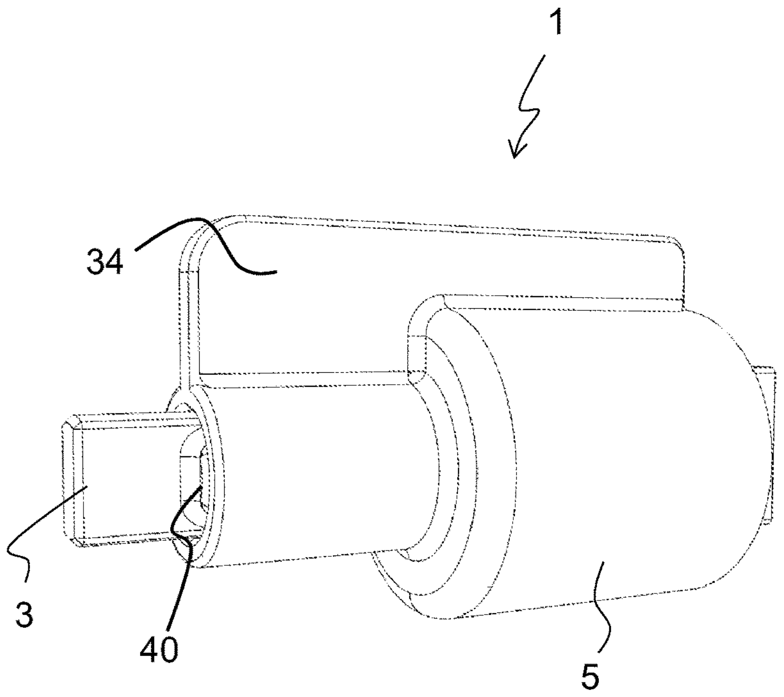
FIG. 1 is a perspective view of the declutching system according to the invention.
Figure 2:
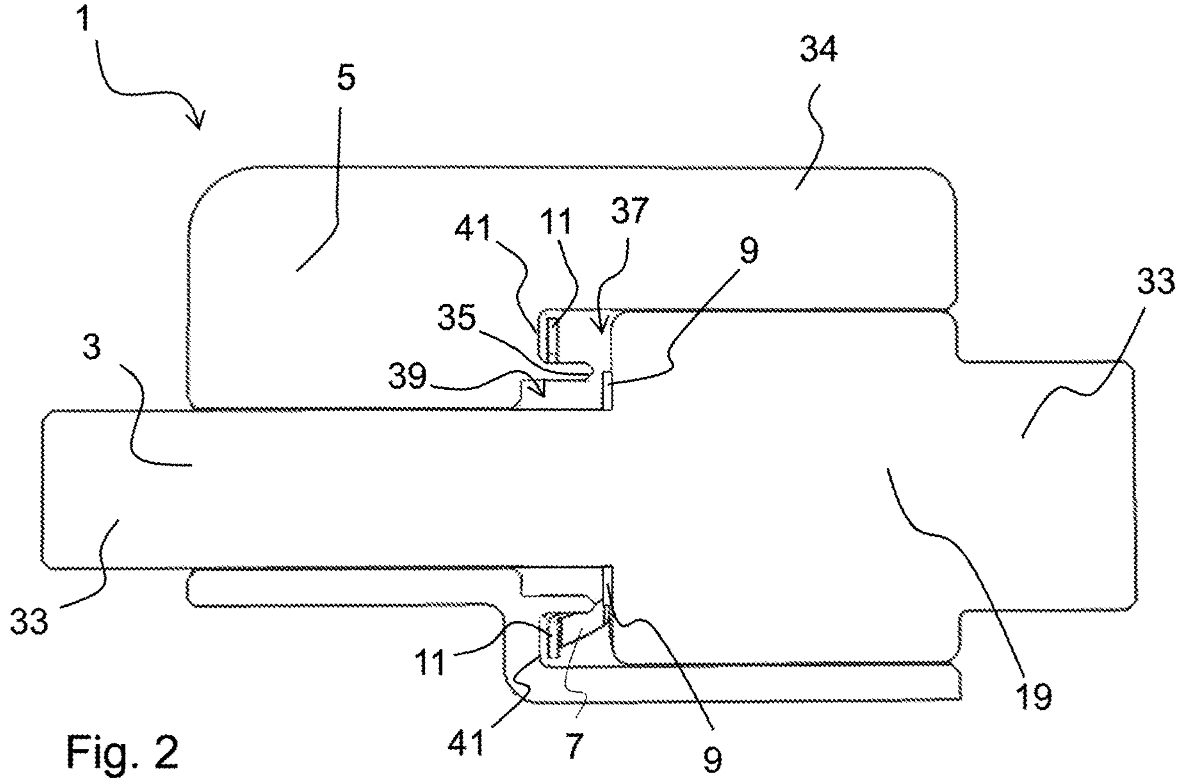
FIG. 2 is a sectional view of the sectional view of the declutching system of FIG. 1.
Figure 3:
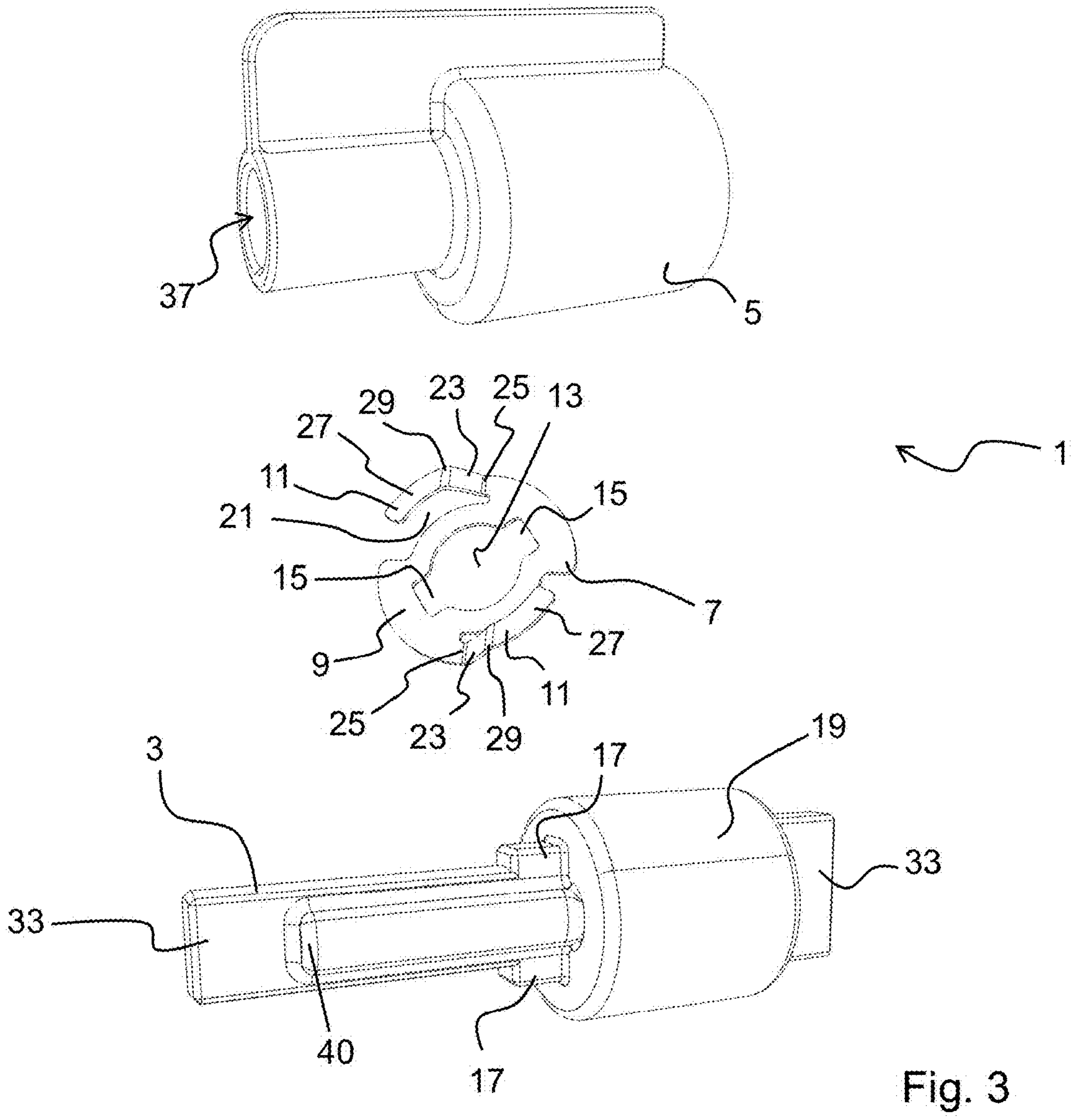
FIG. 3 is an explode view of the declutching system of FIG. 1.

FIGS. 1 to 3 represent different views of a declutching system 1 according to the invention and will be read together.

Figure 5:
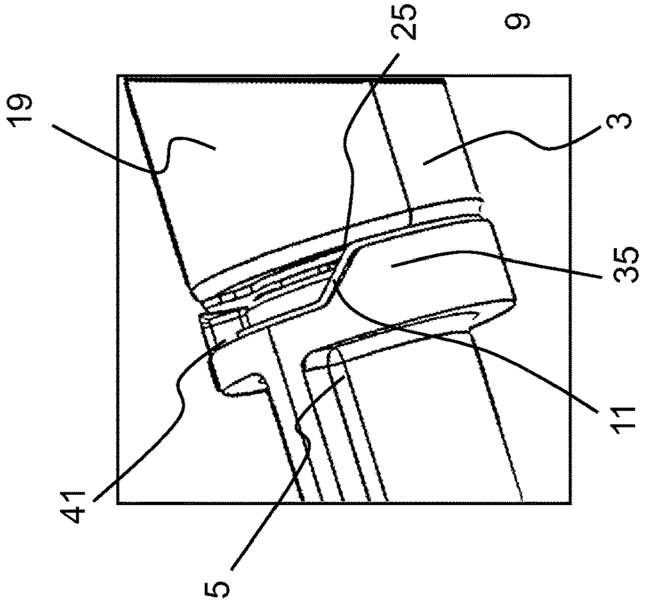

The declutching system 1 of the invention is part of a vehicle handle (not shown) and comprises an axle 3 whereon are arranged a housing 5 and a declutching member 7. The declutching system 1 presents two positions, a clutch position (as represented in FIGS. 1, 2 and 5) and a declutch position (represented in FIG. 7). The rotation of the housing 5 around the axle 3 is blocked or allowed by the declutching member 7. When a torque of magnitude above a particular threshold is applied by the housing 5 on the declutching member 7, the declutching system 1 moves from the clutch position toward the declutch position and the housing 5 pivots around the axle 3.

The declutching member 7 comprises a body 9 to which extends at least one reversible deformable leg 11. By "reversible deformable", it is meant in the invention an elastic deformation. Accordingly, the leg is actively deformed by a force applied upon and passively gets back to its original shape, its rest shape, when the force is not applied anymore. In the embodiment represents on FIGS. 1 to 3, the body 9 is a metal plate having a disc-like shape.

Of course, the body of the declutching member can be made by any other known deformable material, like a plastic one. The body can also have any other shape like a spring disc. The disc-like shape of the body 9 represented here is adapted to allow the rotationally movement of the housing around it. The body 9 can comprise a opening 13 at its centre for the passing of the axle 3. Therefore, the body 9 is slipped around the axle 3 for the assembly of declutching system 1. The body 9 is arranged on the axle 3 in a rotationally and axially fixed manner. For the rotationally fixed purpose and as represented on FIG. 3, the opening 13 of the body 9 can comprise two opposed slit 15 cooperating with two ribs 17 arranged along the axle 3. For the axially fixed purpose and as represented as presented on FIGS. 2 and 3, the axle 3 can be provided with a block element 19 in contact with the body 9 of the declutching member 7. Here, the block element 19 is a barrel with a circular cross-section shape for cooperating with the housing 5 when the latter pivots around the axle 3. On another embodiment, the declutching member can be fixed to the axle. In particular, the declutching member can be made in one piece with the axle.

The at least one deformable leg 11 extends from the body 9 of the declutching member 7. In the embodiment represented, two deformable leg 11 extend from the body 9, and are here arranged on opposed sides of the body 9. The deformable legs 11 are here made in one piece with the body 9 of the declutching member and are cut from the body 9. Accordingly, the body 9 comprises two peripheral openings 21 each having the flattening form of one of the deformable legs 11. Each leg 11 has a base part 23 extending from the body 9 which is in form of an inclined surface 23 regarding the surface of the body 9. Here, the junction between the base part 23 and the body 9 is a principal hinge 25. The said principal hinge 25 allows the legs 11 to be deformed by the housing 5 when the declutching system 1 moves from the clutch position to the declutch position. As represented, each leg 11 can have an opened end part 27 extending parallelly to the surface of the body 9. Accordingly, the junction between the end part 27 and the base part 23 can serve as a secondary hinge 29 for the leg 11 deformation (as shown on FIG. 7).

Figure 4:
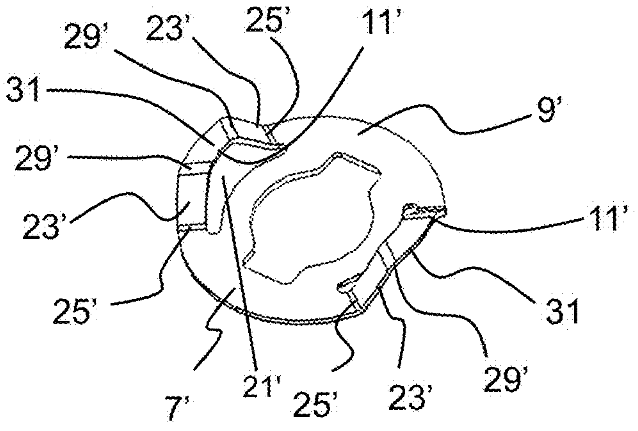
FIG. 4 is a perspective view of an embodiment of a declutching member of a declutching system according to the invention.

On FIG. 4 is represented a second embodiment of a declutching member 7'. Here, the body 9' of the declutching member 7' has the same characteristics as the body 9 of the declutching member 7 described above excepted for the peripheral openings 21' which correspond here to the projected shape on the body of two deformable legs 11'. The said deformable legs 11' are here closed and have a bridge-like shape with two inclined surface 23' (base part 23') extending from the body 9' and joined by a middle part 31 extending parallelly to the surface of the body 9. Each deformable leg 11' has two principal hinges 25' for the junction with the body 9' and two secondary hinges 29' for the junction between the base parts 23' and the middle part 31.

Returning to the embodiment represented on FIGS. 1 to 3, the declutching system 1 comprises a housing 5. As shown, the housing overlays the declutching member 7 and the axle 3 except for the extremities 33 of the latter so it can be fixed on a bracket (not shown) for the handle arrangement. As represented, the axle 3 is provided with rectangular shaped extremities 33 designed to cooperate with the bracket in a fixed manner. Said shape of the extremities 33 avoids the axle 3 to pivot around them. The housing 5 can be provided with a peripherical rib 34 for actuating in rotation around the axle 3 by a surrounding element of the handle.

The housing 5 can comprise an inner shoulder 35 defining a large chamber 37 and a small chamber 39, both having a tube shape. The large chamber 37 overlays the declutching member 7 and cooperates with the block element 19 of the axle 3. The small chamber 37 cooperates with two curve ribs 40 disposed along the axle 3. As represented on FIGS. 5-7, the inner shoulder 35 can be in contact with the body 9 of the declutching member 7 to prevent the axially displacement of the latter in a direction opposed to the block element 19. Further, the at least one deformable leg 11 is in contact with a respective cam 41 arranged within the housing 5. Hence the block element 19 and the housing 5 both act to fixe fix axially the declutching element 7.

The housing 5 carries at least one cam 41 for the cooperation with the at least one leg 11. As represented on FIGS. 3 and 5-7, each cam 41 can be arranged on the inner shoulder 35 of the housing 5. More specifically, each cam 41 can be excavated in the inner shoulder 35 and corresponds to a recess. Each cam 41 can have at least a complementary shape as regards to the deformable legs 11. In particular, each cam 41 can be formed by two slopes facing each other. For example, the cams 41 can have a "U" shape, as represented on FIGS. 5-7, or they can have a "V" shape. As represented, on FIG. 5 the base part 23 of the deformable leg 11 cooperates with one of the rising bars of the "U" shape of the cam 41 while the end part 27 of the deformable leg 11 cooperates with the middle bar of the "U" shape of the cam 41.

Figure 7:
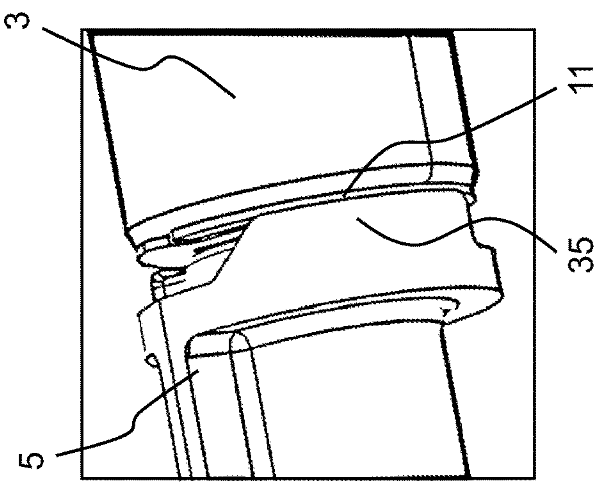
FIGS. 5 to 7 represent a cinematic view of the declutching system of FIG. 1 passing from the clutch position to the declutch position.
Figure 6:
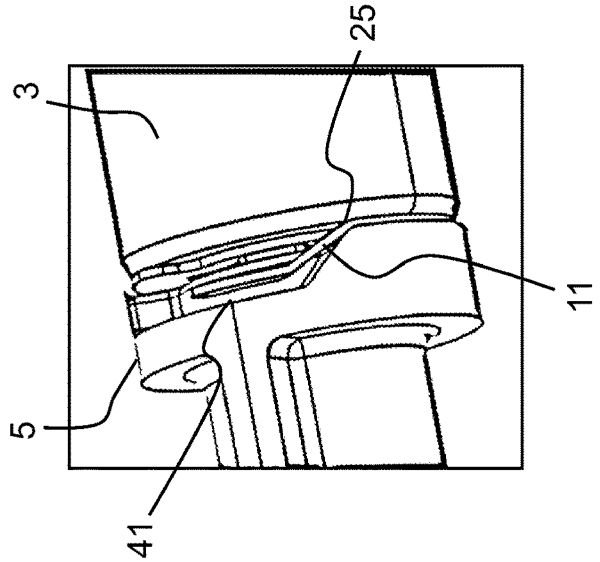

We finally will turn to FIGS. 5-7 which correspond to a cinematic view of the declutching system of the invention moving from the clutch position (FIG. 5) to the declutch position (FIG. 7). For better understanding of the mechanism, the large chamber of the housing has been cut off.

On FIG. 5 is represented the starting position, i.e., the clutch position, where one can see one cam 41 cooperating with one deformable leg 11. The deformable leg 11 prevents the housing 5 to pivot around the axle 3 when the torque of magnitude applied by the cam 41 on the deformable leg 11 is below the mechanical resistance of the principal hinge 25.

On FIG. 6 is represented an intermediate position of the declutching system 1, where the torque of magnitude applied by the cam 41 on the deformable leg 11 is above the mechanical resistance of the principal hinge 25. Hence the leg 11 starts to be deformed, and more particularly to pivot around the principal hinge 25, allowing the housing 5 to pivot around the axle 3.

On FIG. 7 is represented the terminal position, i.e., the declutch position, where both principal and secondary hinges (not visible) of the deformable leg 11 have been deformed into a plane shape and cooperate with a surface of the shoulder 35 adjacent to the cam 41, holding each deformable leg 11 in its deformation state. In that position, the housing 5 sufficiently pivoted around the axle 3 for the actuation of a backup mechanical panel actuator.

The invention claimed is:

1. A declutching system for handle arrangement of a motor vehicle, the declutching system comprising:

an axle on which a housing and a declutching member are arranged, the declutching member being completely surrounded by the housing, the declutching system presenting two positions, a clutch position, in which the declutching member blocks rotation of the housing around the axle by cooperating with at least one cam of the housing, and a declutch position, in which the declutching member allows the housing to rotate around the axle, wherein the declutching member comprises a body from which at least one reversible deformable leg extends, wherein in the clutched position of the declutching system, the at least one reversible deformable leg cooperates with the at least one cam of the housing and blocks the rotation of the housing around the axle, and wherein in the declutch position of the declutching system, the at least one reversible deformable leg is deformed in a direction of the body and thereby enables the rotation of the housing around the axle.

2. The declutching system according to claim 1, wherein the declutching member is made in a single piece.

3. The declutching system according to claim 2, wherein the at least one reversible deformable leg is at least partially cut from the body.

4. The declutching system according to claim 1, wherein the at least one reversible deformable leg of the declutching member extends from at least one peripheral side of the body.

5. The declutching system according to claim 1, wherein the at least one reversible deformable leg of the declutching member has an opened end part and comprises an inclined surface extending from the body.

6. The declutching system according to claim 1, wherein the at least one reversible deformable leg of the declutching member is closed and comprises two inclined surfaces extending from the body which are connected by a middle part.

7. The declutching system according to claim 1, wherein the at least one reversible deformable leg of the declutching member is configured to conform, at least partially, to the shape of the at least one cam of the housing.

8. The declutching system according to claim 1, wherein the body of the declutching member has a central opening cooperating with the axle.

9. The declutching system according to claim 8, wherein the central opening comprises at least one slit cooperating with at least one rib arranged along the axle to block the declutching member from rotating around the axle.

10. The declutching system according to claim 1, wherein the body of the declutching member has a disc shape.

11. The declutching system according to claim 1, wherein the housing comprises an inner shoulder defining a large chamber and a small chamber, the large chamber overlaying the declutching member and the at least one cam being arranged on the inner shoulder.

12. The declutching system according to claim 1, wherein the axle comprises a block element in contact with the body of the declutching member, thereby preventing the body of the declutching member from being axially displaced along the axle in a direction of the block element.

13. A handle arrangement for a door lock comprising a declutching system according to claim 1.

14. The declutching system according to claim 12, wherein the block element presents a circular cross-section which cooperates with the housing when the housing pivots around the axle.

* * * * *